United States Patent [19]

Johansson et al.

[11] Patent Number: 4,793,467
[45] Date of Patent: Dec. 27, 1988

[54] APPARATUS FOR UNLOADING BULK MATERIAL

[75] Inventors: Robert Johansson, Viken; Lennart Tingskog, Helsingborg, both of Sweden

[73] Assignee: Consilium Materials Handling Marine AB, Bjuv, Sweden

[21] Appl. No.: 112,836

[22] PCT Filed: Feb. 4, 1987

[86] PCT No.: PCT/SE87/00049
§ 371 Date: Oct. 19, 1987
§ 102(e) Date: Oct. 19, 1987

[87] PCT Pub. No.: WO87/04996
PCT Pub. Date: Aug. 27, 1987

[30] Foreign Application Priority Data

Feb. 21, 1986 [SE] Sweden ............................ 8600805

[51] Int. Cl.4 ............................................ B65G 65/16
[52] U.S. Cl. .................................. 198/518; 414/141.9; 198/671; 198/658
[58] Field of Search ............... 198/518, 669, 671, 658; 414/139

[56] References Cited

U.S. PATENT DOCUMENTS

| | | | |
|---|---|---|---|
| 3,596,751 | 8/1971 | Siwersson et al. | 198/518 X |
| 3,616,890 | 11/1971 | Pradon | 198/518 |
| 3,685,638 | 8/1972 | Siwersson et al. | 198/671 X |
| 3,867,969 | 2/1975 | Garnett | 414/139 X |
| 3,990,567 | 11/1976 | Siwersson et al. | 198/518 |
| 4,020,953 | 5/1977 | Eklöf et al. | 198/518 X |
| 4,284,369 | 8/1981 | Gsponer et al. | 198/518 X |
| 4,393,609 | 7/1983 | Persson | 198/671 X |
| 4,443,149 | 4/1984 | Isaacson | 198/518 X |
| 4,467,910 | 8/1984 | Siwersson et al. | 198/518 |
| 4,492,302 | 1/1985 | Svens | 198/671 |
| 4,603,774 | 8/1986 | Siwersson et al. | 198/518 |
| 4,609,309 | 9/1986 | Aralt | 198/518 X |

FOREIGN PATENT DOCUMENTS

| | | | |
|---|---|---|---|
| 0057167 | 8/1982 | European Pat. Off. | |
| 0018192 | 2/1978 | Japan | 414/139 |
| 0037628 | 2/1986 | Japan | 198/518 |
| 84/00948 | 3/1984 | PCT Int'l Appl. | 414/139 |
| 86/04566 | 8/1986 | PCT Int'l Appl. | |

Primary Examiner—Leslie J. Paperner
Assistant Examiner—D. Glenn Dayoan
Attorney, Agent, or Firm—Browdy and Neimark

[57] ABSTRACT

A bulk material unloading apparatus comprises a vertical conveyor (10) and a horizontal conveyor connected thereto. A rotable feeder (13) is mounted at the feeding end of the vertical conveyor for feeding material thereinto. According to the invention, the apparatus also has a separately operable material supply device (23, 32) for the controlled supply of material to the feeder. The material supply device has a gimbal-mounted material draw-in device (32) which is universally tiltable relative to the axis of rotation of the feeder (13) and which preferably also is telescopically mounted in relation to the feeder.

6 Claims, 7 Drawing Sheets

APPARATUS FOR UNLOADING BULK MATERIAL

BACKGROUND OF THE INVENTION

1. Field of the Invention

The present invention relates to an apparatus for unloading bulk material from ships in particular, said apparatus comprising a vertical conveyor and a horizontal conveyor connected thereto, said vertical conveyor being provided at its feeding end with a rotary feeding device for feeding the bulk material into the vertical conveyor.

2. The Prior Art

Arrangements of this type have found widespread use in the unloading of especially ships. One example of such an arrangement is described in SE-B-No. 377,099, corresponding to U.S. Pat. No. 3,990,567, according to which the vertical conveyor has a lower feeding device and can be swung outwardly from its vertical position and also raised and lowered, the horizontal conveyor being swingably mounted in such a way that its feeding and cooperating with and connected to the vertical conveyor is raisable and lowerable and also displaceable along a circular arc having its centre at a distance from the feeding end of the horizontal conveyor. In addition, the discharge end of the vertical conveyor and the feeding end of the horizontal conveyor are swingably interconnected, the angle between the two conveyors being controllable by means of a longitudinally controllable device. A development of this arrangement is described in U.S. Pat. No. 4,020,953 in which the vertical and horizontal conveyors are interconnected in a torsionally rigid but pivotal manner for mutual relative movements in a common plane, and furthermore the horizontal conveyor, apart from being swingably connected to the frame or foundation, is tiltably connected thereto for inclination of the plane common to the vertical and horizontal conveyors with respect to a vertical plane.

These prior art arrangements have been equipped with feeding devices according to, for example, U.S. Pat. No. 3,596,751 and have proved to be excellent ship unloaders. The feeding devices serve to promote the feeding of material to the vertical conveyor which frequently is a screw conveyor, the housing and conveyor screw of which are rotatable relative to one another. Usually, the housing is stationary, while the conveyor screw rotates within the housing. Examples of other feeding devices are the device according to European patent publication EP-A-No. 57,167. The devices according to U.S. Pat. No. 3,596,751 and European patent application EP-A-No. 57,167 are of the type where the screw and the feeder are rotated in opposite directions. It thus is the object of the feeder to positively introduce the material into the screw to enable the screw to take an efficient grip on the material and to convey it through the screw conveyor device.

Although the two feeding devices mentioned above by way of example have proved to give a satisfactory supply of material in most cases, they have not always been able to operate efficiently, especially if the vertical conveyor is inclined in relation to the vertical plane or, rather, in relation to the bottom of a ship's hold. Since the unloaders are frequently used for unloading ships, it is necessary to maintain a satisfactory feeding capacity also if the conveyor is inclined to be able to reach into corners and underneath the hatch coaming of the ship's hold. At the same time, it is desired to achieve as complete an unloading as possible also at such not readily accessible locations, thereby to reduce the need for special machines for the cleaning-up of these locations and moving the material within reach of the screw conveyor or the unloader. A further difficulty is that the hold bottom frequently is inclined in relation to the plane in which the frame of the unloading equipment is moving.

It has therefore been proposed to use a control system which, in principle, operates such that, during pendulum movement of the vertical conveyor, an automatic compensation is achieved by raising or lowering the horizontal conveyor, such that the "circular movement" of the feeding device, which is caused by the pendulum movement, will be converted into a rectilinear movement in the horizontal plane. When the tower is rotated, or when the entire unloader is travelling along the ship, no compensation therefore is necessary when the bottom plane of the hold is horizontal or parallel to the plane in which the tower or the entire unloader is moving when travelling along the ship. The problem of compensating for the feeder movement along the bottom of the hold also when the bottom is inclined in relation to the travelling plane of the unloader, has been solved by an invention disclosed in SE-A-No. 8600792-9 which has the same applicant as the present application and according to which the angular position of the feeding device is automatically compensated for during each horizontal movement of the feeding device caused by manual control of the unloader movement, such that the feeding device is made to move in a plane parallel to the bottom plane of the hold.

However, this still leaves the problem that the feeding device does not always take up the best position for efficient cleaning-up and feeding. Thus, it frequently happens that the vertical conveyor is inclined at considerable angles to the vertical plane and to the hold bottom so that the feeder is unable to collect the material and move it into the interior of the feeder and then into the vertical conveyor.

The arrangement according to European patent publication EP-A-No. 57,167 comprises a feeding wing in the form of a helix, for which reason the feeder can operate efficiently only when it is directed exactly perpendicular to the bottom plane of the hold so that the helix will sweep over the hold bottom. The slightest inclination will subject the feeder and the entire unloading equipment to heavy mechanical stresses. The commercially available practical constructions of the feeder according to U.S. Pat. No. 3,596,751 are better in this respect because they function fairly well also when the vertical conveyor is inclined. However, also this type of feeding device tends to leave material and to bump mechanically on the hold bottom when the inclination of the vertical conveyor to the bottom is considerable.

PCT publication WO86/04566 discloses a screw conveyor and a feeding device which are essentially improved in this respect. In this arrangement, the feeder is provided with spokes on which blades are mounted adapted to move the material towards the screw projecting into the feeder, the arrangement being characterised in that the blades have upwardly and downwardly extending portions and are domed like a trawl for drawing the material into the feeder, a lower portion of said blades being arranged to lift the material and move it inwardly towards the feeder, and an upper part of said blades being adapted to draw the material downwards and inwardly towards the interior of the feeder. In its practical constructions, this feeder has three blades which are arranged symmetrically, such that the feeder upon rotation resembles a globe. The globe-like feeder will thus operate in the manner of a milling cutter which efficiently digs into the material, even if this should be densely packed. The difficulty is, however, that the best rpm for tearing loose material is not always the best for feeding the material to the vertical conveyor.

Another problem remaining in prior art feeders therefore is connected with the desideratum that it should be possible to supply the vertical conveyor with bulk material in as smooth and controlled a flow as possible in order to maintain a high degree of filling in the vertical screw and, thus, a high screw efficiency. It is common practice, in connection with screw conveyors, that the screw is operated at a fixed speed in the range 350-500 rpm, and that one tries to maintain the degree of filling in the screw conveyor at at least 80%, if possible up to 100%, the degree of filling being supervised by measuring the motor current to the driving motor of the vertical conveyor. The degree of filling is controlled by infinitely varying the speed of the feeder, usually in the range 20-60 rpm, in order to compensate for a diminishing degree of filling by increasing the speed, and vice versa. However, this compensation requires access to material within the operating range of the feeder so that the feeder speed need not lie in the upper half of the speed range, which may cause dust problems during unloading of dusty material. In view hereof, the tubular feeder drive shaft surrounding the lower end of the tubular shell of the vertical conveyor is frequently provided with externally mounted tearing means which tear off material from the usually packed material mass in the hold. However, it was found that this tearing and material supply to the feeder is not sufficient under many service conditions. The tearing function frequently necessitates a different speed than the function as a feeder to the feeding end of the vertical conveyor, and it is therefore desired to be able to supply material to the feeding end of the vertical conveyor while utilising a material feeding device whose speed can be controlled with regard to what is required for the actual tearing operation and the feeding of the material and for suppressing unnecessary dust formation during unloading of dusty materials, such as cement. Apart from wanting to suppress unnecessary dust formation, it is also desired, during unloading of dusty materials, to effect separate and controllable tearing also of densely packed material, such as coal, soya meal and tapioca.

A further problem encountered in feeding devices of the type disclosed by European patent publication EP-A-No. 0,057,167 is that such a device gives its best collecting effect if it is operated at low speed, which makes it difficult to satisfy both the tearing function and the function of controlling the degree of filling, and there therefore is need for solving also this problem.

SUMMARY OF THE INVENTION

According to the present invention, the above-mentioned problems are solved by means of an apparatus which is characterised by the features stated in claim 1. The apparatus for unloading bulk material thus comprises, in accordance with the invention, a vertical conveyor and a horizontal conveyor connected thereto. A rotatable feeder is provided at the feeding end of the vertical conveyor for feeding material into said feeding end. According to the invention, the apparatus also has a separately driven material feeding device for controlled feeding of material to the feeder. In an especially advantageous embodiment of the invention, the material feeding device has a gimbal-mounted material take-up device which is universally inclinable relative to the axis of rotation of the feeder and which preferably also is telescopically mounted in relation to said feeder.

A basic idea of the invention thus is to ensure as far as possible that bulk material is available within the operating range of the feeder so that the feeder can be utilised efficiently for controlling the degree of filling of the vertical conveyor.

When use is made of a gimbal-mounted material supply device according to the invention, the material take-up device will do a far better collecting and material supply work than in prior art constructions. Thus, it is possible to operate the material take-up device at a speed suitable for collecting and tearing, simultaneously as the normal feeder of the vertical conveyor is operated at the speed which is best for feeding material into the vertical conveyor. With such an arrangement, it will therefore be easy to avoid the difficulties frequently encountered in the unloading of ships by means of equipment of the type disclosed in U.S. Pat. No. 3,596,751, EP-A-No. 57,167 and also PCT publication WO86/04566, i.e. that it is not possible to ensure an entirely smooth supply of material to the vertical conveyor. The inability to achieve this is a result of the compromise which, in prior art unloading equipment, must constantly be made between the function of the feeding device as a feeder and the function of the feeder as a tearing and material supply device.

Especially advantageous embodiments of the invention are disclosed in the sub-claims.

BRIEF DESCRIPTION OF THE DRAWINGS

The invention will be described in more detail below, reference being had to the accompanying drawings, in which.

DETAILED DESCRIPTION OF THE PREFERRED EMBODIMENT

Figure 1:
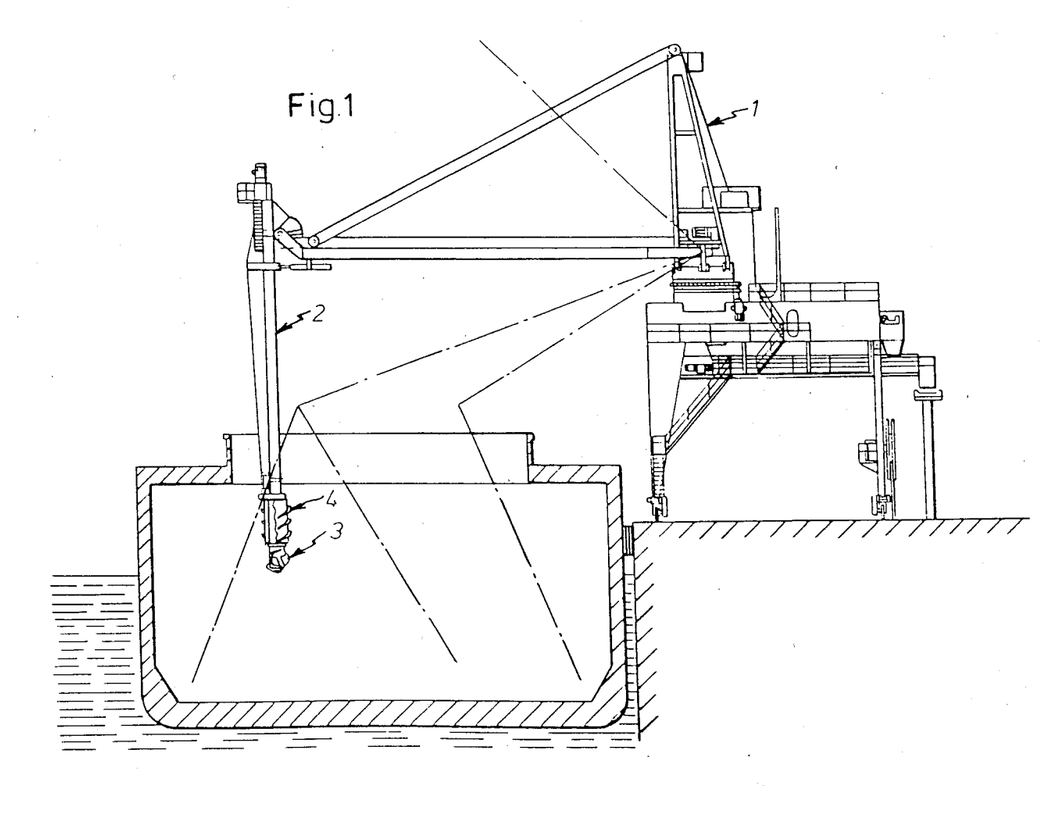
FIG. 1 illustrates an embodiment of a take-up device according to the invention.

FIG. 1 shows a ship unloader 1 having a screw conveyor 2 with a feeder 3 and a material supply device 4 according to the present invention. The ship unloader is designed substantially in accordance with U.S. Pat. No. 4,020,953 where the unloader has a feeder of the type disclosed in U.S. Pat. No. 3,596,751, but this feeder is to be supplemented with a material supply device of the type defined in the appended claims, to become an unloading device according to the present invention. Thus, it must be supplemented with, for example, a device according to FIG. 2 or a device according to FIGS. 3-8.

Figure 2:
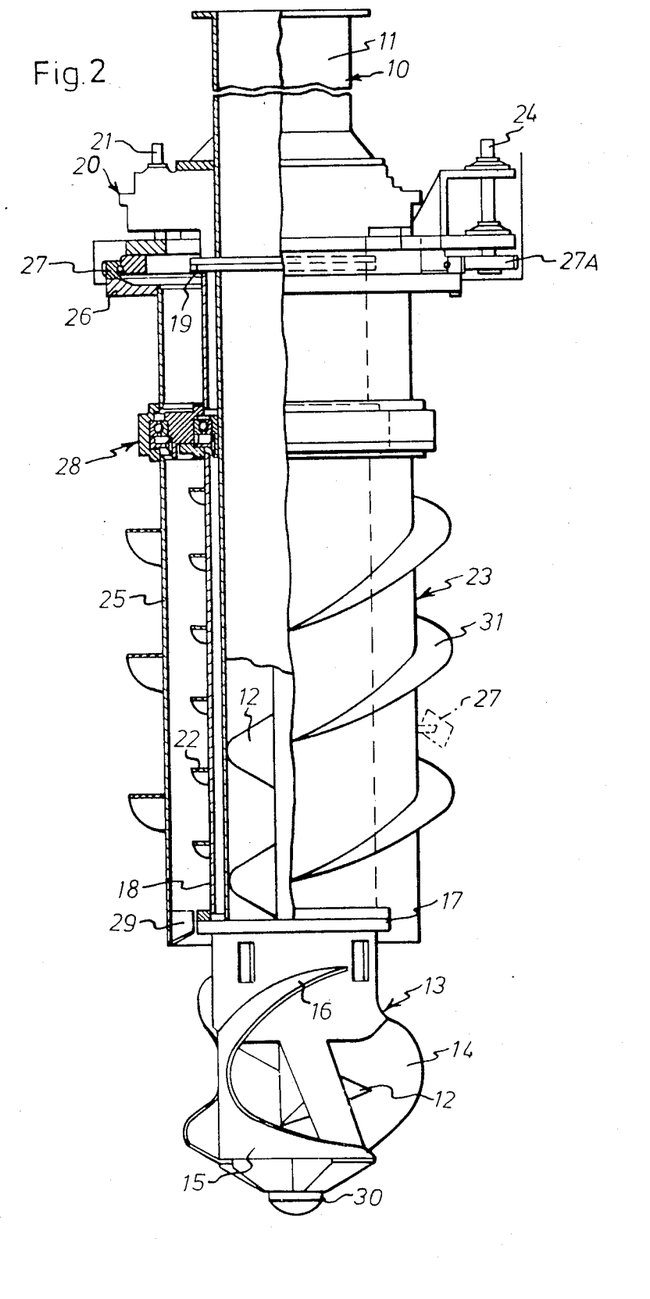
FIG. 2 illustrates, partly in longitudinal section, an embodiment of a rotatable material supply device comprised by the arrangement according to the invention.

FIG. 2 merely shows the lower part of a vertical conveyor formed as a screw conveyor, said vertical conveyor being equipped such that it forms part of an unloading apparatus according to the invention. The screw conveyor 10 has a stationary pipe 11 in which a screw 12 is rotatably mounted. The screw 12 extends down into a feeder 13 which, in the embodiment illustrated, is designed in accordance with PCT publication WO86/04566 and thus has trawl-shaped blades 14 for drawing in bulk material into the feeder, a lower portion 15 of said blades being adapted to raise the material and convey it inwardly toward the interior of the feeder, and an upper portion 16 of said blades being adapted to pull the material downwards and inwardly toward the interior of said feeder. The feeder head proper is mounted by means of a flange connection 17 on a supporting pipe 18 which in turn is mounted, by means of a flange connection 19, on a driving device 20 having a gear rim (not shown) which is rotated by means of a motor shaft 21 having a gear transmission (not shown). The outer side of the supporting pipe 18 is provided with helical wings 22 which, upon rotation of the supporting pipe, endeavour to convey the material downwardly toward the feeder 13. According to the invention, there is provided, on the outer side of the supporting pipe, a rotatable material supply device 23 adapted to supply material to the feeder 13 and to be operated, by means of a driving motor (motor shaft 24), at a rotational speed adapted to the supply of the material to the feeder. The material supply device has, in this instance, a driving pipe 25 provided at its upper end with a flange joint 26 connected to a gear rim 27 which is driven by a pinion 27A mounted on the motor shaft 24. For mutually supporting the driving pipe, the supporting pipe and the pipe 11 of the screw conveyor, an intermediate bearing arrangement 28 is provided. Finally, there are provided, at the lower end of the driving pipe, obliquely inwardly directed guide plates 29 which, when subjected to heavy lateral pressure, can support themselves against and slide along the finished edge surface of the flange joint. To provide for mutual guiding of the rotatable parts, the shaft of the screw 12 also is mounted in a bearing 30 at the lower end of the feeder.

The unloader according to FIG. 2 thus makes it possible to vary the speed of the feeder 13 in order to maintain the desired degree of filling in the conveyor 12, simultaneously as tearing of the surrounding material can be carried out by means of the material supply device 23. Tearing wings 31 on the device 23 will, during operation of the unit, tear the material loose and convey it downwardly toward the feeder which thus is supplied with material. As indicated by dash-dot lines, the material supply device may also comprise genuine tearing means or rakes 27. The screw usually is rotated in one direction at a speed of, for example, 400 rpm, whereas the feeder 13 is rotated in the opposite direction at a varying speed of 20-60 rpm in order to maintain the desired degree of filling. The material supply device 23, on the other hand, is driven more slowly at a controllable speed of, for example, 6-10 rpm for the unloading of cement, and 10-30 rpm for the unloading of, for example, tapioca and coal.

Figure 3:
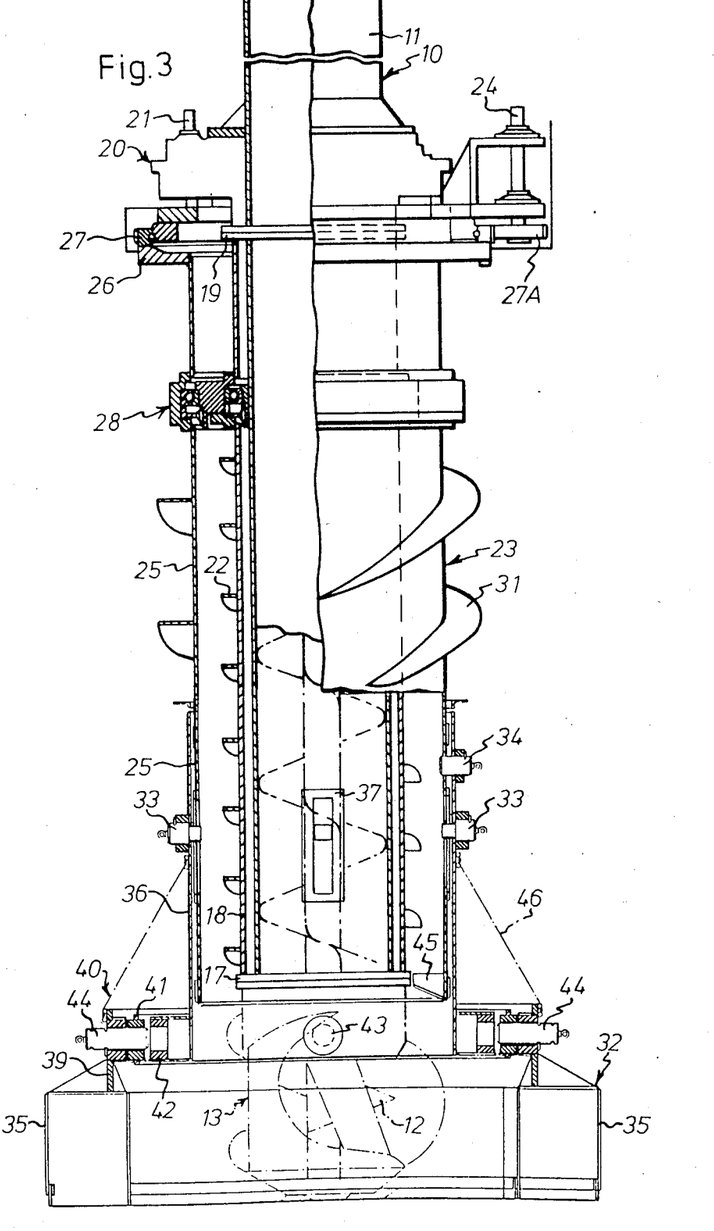
FIG. 3 illustrates another embodiment of a rotatable material supply device according to the invention.

The embodiments of the invention illustrated in FIGS. 3-8 will now be described in more detail. Also here only the lower portion of the vertical conveyor 10 of the unloader is shown. In FIG. 3, the material supply device 23 comprises not only the driving pipe 25 with its externally mounted tearing wings 31, but also a material draw-in device 32 which surrounds the feeder 13 and is connected to the driving pipe 25 by means of pins 33 and, optionally, also a pin 34. The material draw-in device 32 has, in the embodiment illustrated, two essentially helical wings 35 for drawing in material towards the feeder 13.

Figure 5:
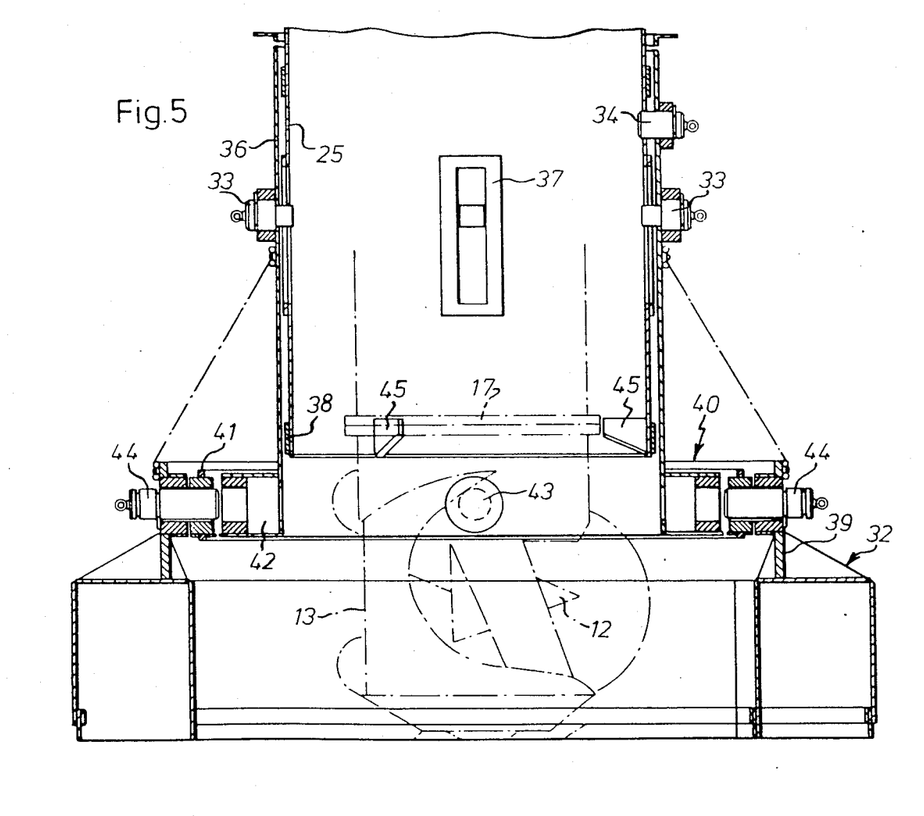
FIG. 5 illustrates, on a larger scale, part of the device according to FIG. 3 when this is used together with a different driving pipe.
Figure 6:
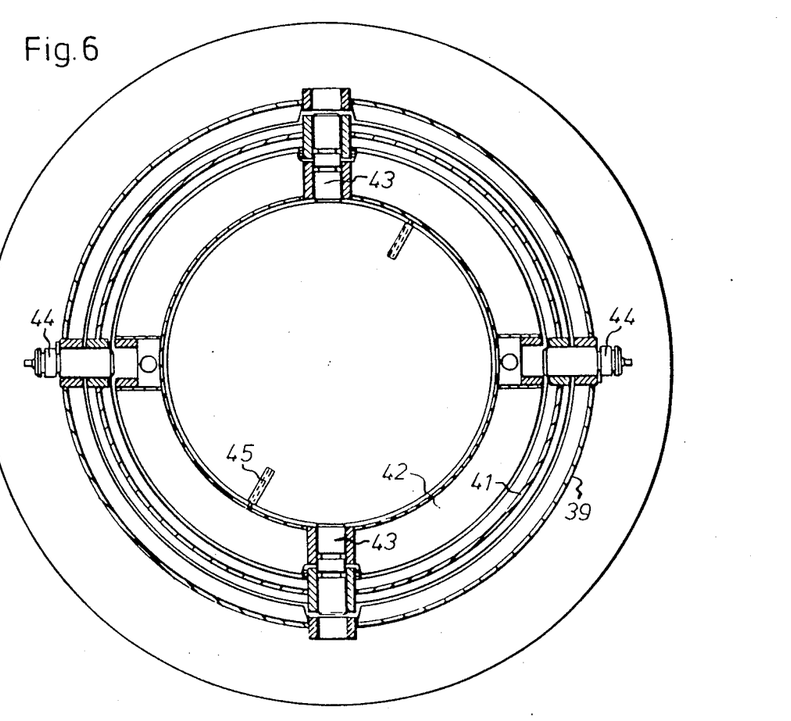
FIG. 6 is a section along line VI—VI in FIG. 5.
Figure 7:
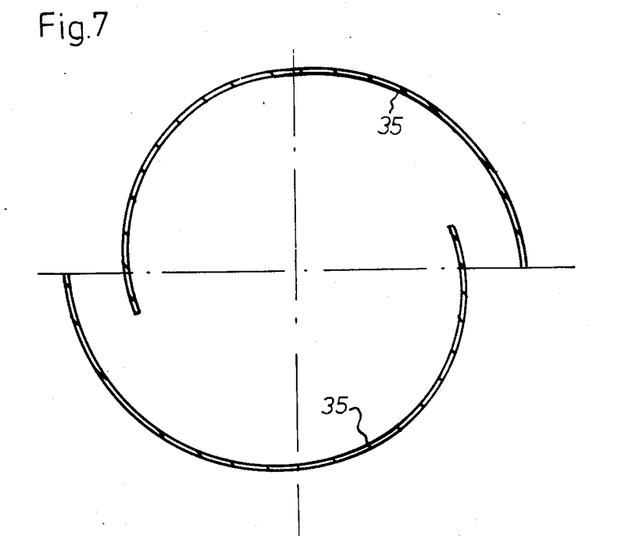
FIG. 7 is a section (with some parts omitted) along line VII—VII in FIG. 5.

As will appear from FIG. 5, the material draw-in device 32 may, however, be mounted on a driving pipe 25 which has no tearing wings 31, if the collecting and tearing effect provided by the material draw-in device is sufficient.

As shown in FIGS. 3 and 5, the material draw-in device 32 has a pipe 36 pushed over the lower end of the driving pipe 25 and attached thereto. Alternatively, the pipe 36 may be pushed into the driving pipe 25. The pipes 25 and 36 may be rigidly interconnected, but frequently it is preferred to provide a telescopic connection, as in the embodiment illustrated. In this case, the driving pipe has been provided with four slits 37 which are arranged in pairs diametrically opposite one another and into which the pins 33 project and along which the pins can move in the axial direction. By this arrangement, the material draw-in device 32 will be telescopically mounted on the supporting pipe 25, such that the entire material draw-in device will be axially movable relative to the screw conveyor 10 and the feeder 13. To ensure gliding during the telescopic movement, a number of guide lugs 38 are mounted in suitable positions between the pipes 25 and 36. To be able to block the telescopic movement, should this be required, use is made of the above-mentioned pin 34 which in its locking position engages in a locking hole in the driving pipe 25. Several such locking pins may be utilised.

The wings 35 are mounted on an annular member which forms the outer ring in a gimbal mounting 40 connecting the essentially helical wings 35 with the pipe 36 and thus with the driving pipe 25. The gimbal mounting also comprises an intermediate ring 41 and an inner ring 42. The inner ring is rigidly mounted on the outer side of the pipe 36 and is rotatably connected to the intermediate ring by means of journals 43, while the outer ring and the intermediate ring are interconnected by means of journals 44. The journals 43 are retractable from the position shown in FIG. 6 to a position in which they extend between all three rings 39, 41, 42, such that their mutual movability is locked. The journals 44 are similarly insertable, such that their inner part projects into a corresponding hole in the inner ring, whereby locking is achieved also in this direction.

For guiding purposes, and in order to provide additional support to the driving pipe 25, inner guide plates 45 are mounted on the inner side of the driving pipe 25 to abut against the feeder flange 17 under the action of heavy lateral loads.

Figure 4:
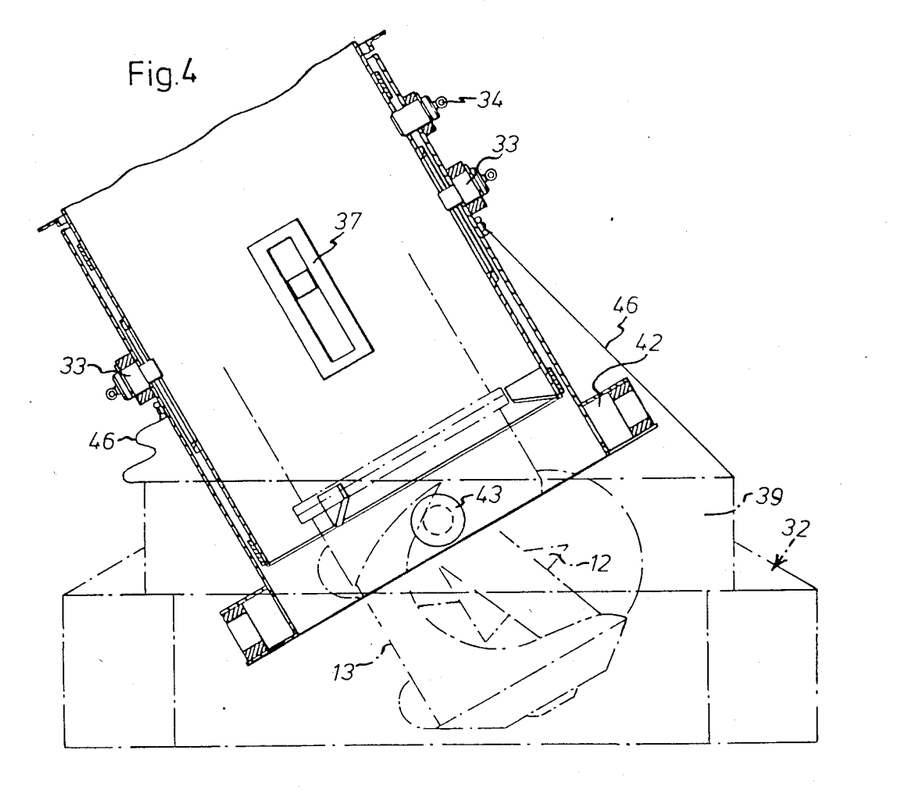
FIG. 4 shows a different adjusting position of the device according to FIG. 3.

To prevent dust formation when the draw-in device 32 inclines heavily, use may be made, as indicated schematically in FIGS. 3-5, of a bellows 46 which may consist of a highly elastic rubber material and thus establishes a tight connection between the outer edge of the outer ring 39 and the outer side of the pipe 36.

As shown in FIG. 4, the draw-in device 32 has been formed with such inner dimensions that the feeder will go clear of the helical wings 35 also at large angles of inclination. In the embodiment illustrated, the equipment may tolerate an inclination of about 30°. A suitable outer diameter of the draw-in device may be 2-2.5 m.

Figure 8:
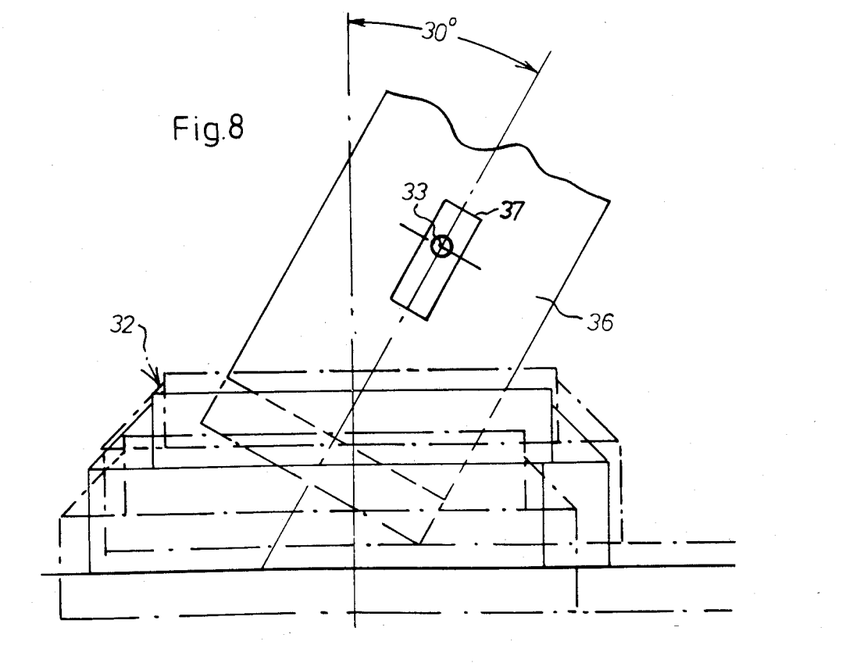
FIG. 8 illustrates the adjustability of the devices according to FIGS. 3–7.

FIG. 8 illustrates the great flexibility of the arrangement shown in FIGS. 3-8. The telescopic connection between the pipes 25 and 36 enables the material draw-in device 32 to adapt itself to the base and to assume different vertical positions indicated by dash-dot lines in FIG. 8. The magnitude of the flexibility depends upon the length of the slits 37. In many cases, 100-200 mm is a suitable slit length. The telescopic flexibility is utilised in all adjusting positions between the material feeder 32 and the screw conveyor 10.

It will be evident from the above that the provision of a gimbal joint between the vertical screw conveyor 10 equipped with its normal feeder 13 and the material draw-in device 32 makes it possible to maintain, during final unloading, adequate parallel alignment between the ship's bottom and the material draw-in device so that the latter will obtain maximum efficiency and be less subject to damage due to careless handling than, for example, the feeder according to EP-A-No. 0,057,167. If this arrangement is combined with the arrangement according to the above-mentioned concurrently filed patent application, one obtains a system capable of unloading ships with a high degree of efficiency, even if the ship's bottom should be inclined in relation to the plane in which the unloading equipment is travelling alongside the ship. Owing to the extensive tiltability and the unimpaired clean-up capacity, the equipment can easily reach into every corner of the hold bottom, whereby the degree of efficiency is vastly improved and far shorter unloading times are obtained. Because the material supply device can be operated at a separate speed of rotation, different from that of the feeder, it is possible to select the most advantageous combination of speeds for the screw, the feeder and the material supply device, such that an optimal degree of filling is obtained and environmental pollution by dust etc. is reduced to a minimum. For cement, low speeds are selected, while for tapioca, soya meal etc. it is no longer necessary to employ loaders in order to increase the capacity since the material supply device can now be operated in a manner suitable for supplying these materials which can be efficiently torn loose. The arrangement also makes it possible to reduce the power of the driving motors with unimpaired unloading capacity.

When the equipment according to the present invention is to be used for unloading bulk material from, for example, a ship, use is made of the material supply device 23 according to FIG. 2 during the first and main unloading phase, the device 23 being utilised to ensure that there is always a sufficient supply of material around the feeder 13 to enable the feeder to constantly maintain the degree of filling of the vertical conveyor 2 at the desired level. During the final unloading phases, the material draw-in device 32 is used for drawing in the material to the feeder 13 in that it closely follows the hold bottom. The device 32 may then be used either as a single material supply device (as in FIG. 5) or as a complement to the material supply device 23 (as in FIG. 3).

In the arrangement according to the invention, the vertical and horizontal conveyors may both be screw conveyors. Furthermore, and also within the scope of this invention, other types of vertical and horizontal conveyors may be used. For example, the horizontal conveyor, and indeed also the vertical conveyor, may be replaced by belt conveyors, in which case it is frequently suitable to retain a short screw conveyor between the feeder 13 and the belt conveyor, as shown in EP-B-No. 53,592.

We claim:

1. An apparatus for unloading bulk material from ships in particular, said apparatus comprising a vertical conveyor and a horizontal conveyor connected thereto, said vertical conveyor being provided at its feeding end with a rotary feeding device for feeding the bulk material into the vertical conveyor, the apparatus also comprising a rotatable material supply device adapted to supply material to the feeder and operable by means of a driving motor at a speed adapted to the supply of material to said feeder, characterized in that the material supply device has a material draw-in device surrounding the feeder and having at least one helical wing which is adapted to convey bulk material in a substantially radial inward direction toward said feeder and which is connected with the motor of the material supply device by a driving pipe surrounding the supporting pipe of the feeder, and that said material draw-in device is connected to said driving pipe by means of a gimbal joint to be universally tiltable relative to said driving pipe, said feeder and said vertical conveyor.

2. An apparatus as claimed in claim 1, characterized in that said driving pipe is telescopically connected to said gimbal joint and thus to said material draw-in device, by a telescopic means.

3. An apparatus as claimed in claim 2, characterized in that a protective bellows is provided between an outer ring of said gimbal joint and said driving pipe, and an outer pipe of said telescopic means, connected to the inner ring of said gimbal joint, respectively.

4. An apparatus as claimed in claim 1, characterized in that said material draw-in device has an inner width such that it is universally tiltable at angles of up to about 30°, without obstructing said feeder.

5. An apparatus as claimed in claim 1, characterized in that said gimbal joint has locks adapted to eliminate the effect of the gimbal joint, the journals of said gimbal joint preferably being axially displaceable to interconnect adjacent rings of said gimbal joint, and forming said locks.

6. An apparatus as claimed in claim 1, characterized in that said material draw-in device is releasably connected to said driving pipe.

* * * * *